United States Patent Office 2,824,086
Patented Feb. 18, 1958

2,824,086

POLYMERS FROM REACTION OF 3-AMINO-1,2,4-TRIAZOLE WITH ORGANIC DIISOCYANATES OR CARBONATES

Edmund B. Towne, John W. Wellman, and Joseph B. Dickey, Kingsport, Tenn., assignors to Eastman Kodak Company, Rochester, N. Y., a corporation of New Jersey No Drawing. Application October 31, 1955
Serial No. 544,052

10 Claims. (Cl. 260—77.5)

This invention relates to polymers from 3-amino-1,2,4-triazole and to a process for their preparation.

More particularly, our new polymers are believed to be linear resinous materials which are characterized by having a urea type of linkage between the triazole groups, for example, as shown in the following fundamental recurring structural units I, II and III representing three different species of our new polymers:

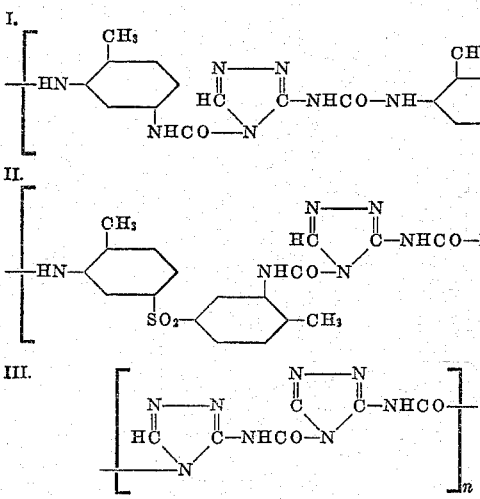

wherein $n$ represents a whole number indicating that the structure within the bracket recurs $n$ number of times to give a resinous product. The above defined polymers of the invention are thermoplastic materials having relatively high melting points above 260° C., and some even above 300° C., and are insoluble in common organic solvents such as acetone, methanol, dioxane, benzene etc., but readily soluble in solvents such as dimethyl formamide, dimethyl acetamide, γ-butyrolactone, and the like, from which solutions or dopes they may be spun to dyeable fibers or coated to clear, tough and heat-resistant films or molded into stable shaped articles.

It is accordingly, a primary object of our invention to provide a new class of resinous polymers as described. Another object is to provide solutions of these polymers and shaped articles thereof. Another object is to provide a process for preparing these polymers. Other objects will become apparent from the following description and examples.

In accordance with our invention, we prepare the new class of resinous polymers of the invention by condensing 3-amino-1,2,4-triazole with certain organic diisocyanates or with certain organic carbonates in about equimolar proportions; however, either component may be used in substantial excess of the stoichiometric amount and still result in products illustrated by structures I, II and III, for example, in the molar ratios of from 2:1 to 1:2 (about 67 to 33 and 33 to 67 mol percent, respectively) of 3-amino-1,2,4-triazole to the organic diisocyanate or the organic carbonate. The components are heated together, preferably in vacuo up to a final temperature of about 350° C., but preferably from about 100°–320° C. Advantageously, the components may be heated in an inert liquid medium such as 1,4-dioxane, ethyl methyl ketone, etc., the solvent being subsequently on completion of the reaction eliminated by the usual methods of isolating a polymeric product such as distillation, extraction, etc.

Suitable organic diisocyanates and carbonates include tolylene 2,4-diisocyanate, 4,4'-ditolylsulfone 3,3'-diisocyanate, dialkyl carbonates such as dimethyl carbonate, diethyl carbonate, di-n-propyl carbonate, di-n-butyl carbonate, etc., and diaryl carbonates such as diphenyl carbonate, ditolyl carbonates such as di-(p-tolyl)carbonate, etc., i. e. organic carbonates which may be represented by the following general formula:

IV. 

wherein R represents an alkyl group of from 1 to 4 carbon atoms or a cyclic aryl group containing from 6 to 7 carbon atoms such as phenyl or o-, m- or p-tolyl groups.

The preparation of the 3-amino-1,2,4-triazole may be carried out in accordance with the procedure described by C. F. H. Allen and A. Bell, Organic Syntheses, vol. 26, pages 11–12 (1946), by heating aminoguanidine carbonate with concentrated sulfuric acid and then treating the dried residue with formic acid. However, the 3-amino-1,2,4-triazole may also be readily prepared by heating aminoguanidine carbonate with formic acid, cooling and filtering off the product. The reaction with intermediate steps left out is as follows:

V.

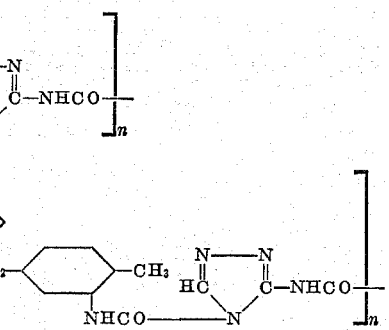

Both the amino group and the imino group are reactive with the mentioned organic diisocyanates and carbonates.

The tolylene 2,4-diisocyanate may be prepared by reacting 2,4-diaminotoluene with phosgene, while the 4,4'-ditolylsulfone-3,3'-diisocyanate may be prepared by reacting 3,3'-diamino-4,4'-ditolylsulfone with phosgene in benzene solution in the usual manner. The intermediate 3,3'-diamino-4,4'-ditolylsulfone may be made by catalytically reducing the corresponding dinitro compound which latter is obtained by nitrating 4,4'-ditolylsulfone.

The following examples and description will serve further to illustrate the manner whereby we practice our invention.

Example 1

5.6 g. of 3-amino-1,2,4-triazole and 17.4 g. of tolylene 2,4-diisocyanate were heated in 1000 cc. of 1,4-dioxane at reflux temperature (approx. 102° C.) for one hour. The dioxane was then removed in vacuo (less than 1 mm. of pressure) and the product heated in vacuo at 300° C. for one hour. A polymeric product was obtained which corresponded to structure I. It did not melt below 300° C. and was soluble in common organic solvents such as acetone, benzene, ethyl methyl ketone, etc. as well as in solvents such as dimethyl formamide. When melted in a crucible, it could be cast by pouring into suitable molds to give intractable articles having good resistance to extreme temperatures.

*Example 2*

5.6 g. of 3-amino-1,2,4-triazole and 22.0 g. of diphenyl carbonate were heated together in vacuo at 110° C. The phenol which was liberated was collected as it formed. When all of the phenol had been removed, the mass obtained was raised to a temperature of 300° C. and maintained at this temperature in vacuo for one hour. The product obtained corresponded to structure III. It did not melt below 300° C. and was insoluble in common organic solvents, but soluble in dimethyl formamide, dimethyl acetamide and in γ-butyrolactone. On coating a solution of this product in dimethyl formamide, a clear, tough, heat-resistant film was obtained.

*Example 3*

16.2 g. of 4,4'-ditolylsulfone 3,3'-diisocyanate and 8.4 g. of 3-amino-1,2,4-triazole were heated in 200 cc. 1,4-dioxane for 15 minutes at 110° C. The product which

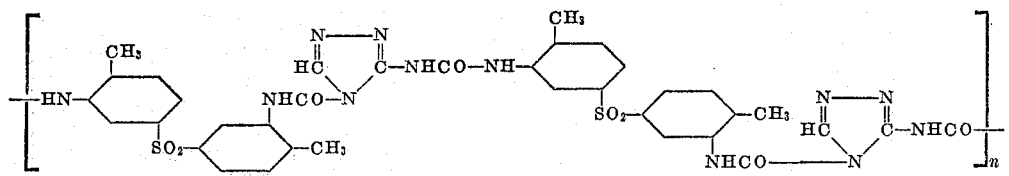

formed was then freed of 1,4-dioxane and heated at 300° C. for one hour in vacuo. The resulting polymer had a

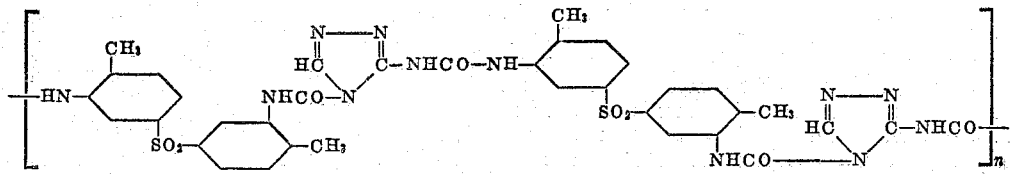

melting point of 265° C. and was soluble in solvents such as dimethyl formamide, dimethyl acetamide and γ-butyrolactone. It corresponded to structure II. On spinning a dimethyl acetamide solution of the polymer, filaments were obtained which could be employed as a high tenacity yarn or stable fiber.

*Example 4*

5.6 g. of 3-amino-1,2,4-triazole and 11.8 g. of diethyl carbonate were heated together in vacuo at 110° C. The ethyl alcohol evolved was collected as it formed. When all of the available ethyl alcohol had been removed, the mass was raised to a temperature of 300° C. and maintained at this temperature in vacuo for one hour. The resulting polymer corresponded to structure III. It melted above 265° C. and was not soluble in common organic solvents, but soluble in dimethyl formamide, dimethyl acetamide and γ-butyrolactone. This product was introduced as a powder into a standard high-temperature molding apparatus and injection molded to give a test spoon which was tough and heat resistant.

By following the procedures set forth in the preceding examples, generally similar condensation polymers can be prepared from any of the mentioned organic diisocyanates or organic carbonates. All of the polymers of the invention are soluble in one or more solvents such as dimethyl formamide, dimethyl acetamide, etc. Such solution or dopes can be coated on film-forming surfaces to give continuous structure tough sheets or films that are useful as photographic film support materials, or employed as overcoating materials, or used as spinning solutions from which fibers can be prepared by wet or dry spinning processes. As previously indicated, the polymers of the invention can also be spun directly to fibers from their melts. Such solutions, dopes and melts, as well as molding compositions containing one or more of the polymers of the invention, can be modified by incorporation therein of suitable fillers, pigments, dyes, and the like, before, during or after the condensations.

What we claim is:

1. A resinous polymer selected from the group consisting of (1) a resinous polymer consisting of the recurring structural unit:

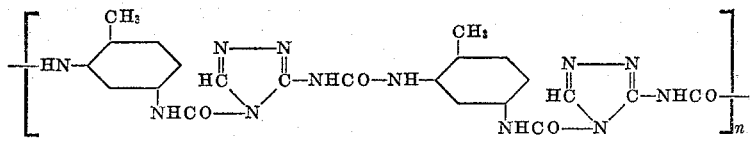

(2) a resinous polymer consisting of the recurring structural unit:

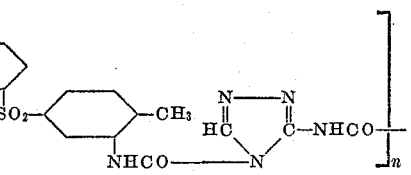

and (3) a resinous polymer consisting of the recurring structural unit:

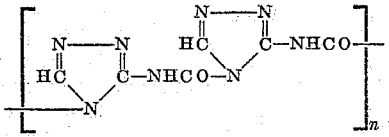

wherein *n* represents a whole number.

2. A resinous polymer consisting of the recurring structural unit:

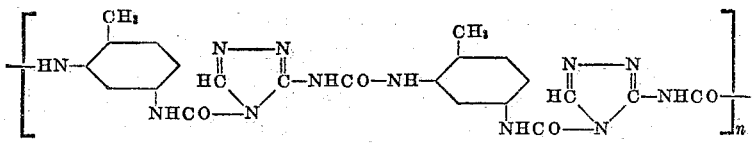

3. A resinous polymer consisting of the recurring structural unit:

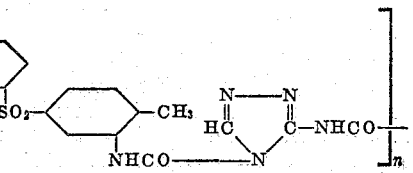

wherein *n* represents a whole number.

4. A resinous polymer consisting of the recurring structural unit:

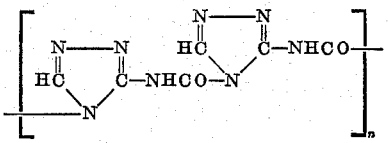

wherein $n$ represents a whole number.

5. A process for preparing a resinous polymer of claim 1 which comprises heating a mixture comprising from about 67 to 33 mol percent of 3-amino-1,2,4-triazole and from 33 to 67 mol percent of a compound selected from the group consisting of tolylene 2,4-diisocyanate, 4,4'-ditolylsulfone 3,3'-diisocyanate, diphenyl carbonate, a ditolyl carbonate and a dialkyl carbonate wherein each alkyl group contains from 1 to 4 carbon atoms, at a temperature of from 100° to 320° C.

6. A process for preparing the resinous polymer of claim 2 which comprises heating a mixture comprising from 67 to 33 mol percent of 3-amino-1,2,4-triazole and from 33 to 67 mol percent of tolylene 2,4-diisocyanate, at a temperature of from 100° to 320° C.

7. A process for preparing the resinous polymer of claim 3 which comprises heating a mixture comprising from 67 to 33 mol percent of 3-amino-1,2,4-triazole and from 33 to 67 mol percent of 4,4'-ditolylsulfone 3,3'-diisocyanate, at a temperature of from 100° to 320° C.

8. A process for preparing the resinous polymer of claim 4 which comprises heating a mixture comprising from 67 to 33 mol percent of 3-amino-1,2,4-triazole and from 33 to 67 mol percent of a compound having the general formula:

$$(RO)_2C=O$$

wherein R represents a member selected from the group consisting of an alkyl group of from 1 to 4 carbon atoms, a phenyl group and a tolyl group, at a temperature of from 100° to 320° C.

9. A process for preparing the resinous polymer of claim 4 which comprises heating a mixture comprising from about 67 to 33 mol percent of 3-amino-1,2,4-triazole and from 33 to 67 mol percent of diphenyl carbonate, at a temperature of from 100° to 320° C.

10. A process for preparing the resinous polymer of claim 4 which comprises heating a mixture comprising from about 67 to 33 mol percent of 3-amino-1,2,4-triazole and from 33 to 67 mol percent of diethyl carbonate, at a temperature of from 100° to 320° C.

References Cited in the file of this patent
UNITED STATES PATENTS 2,512,634    Fisher et al. _____ June 27, 1950